United States Patent [19]

Kogiso

[11] Patent Number: 5,678,651
[45] Date of Patent: Oct. 21, 1997

[54] SYSTEM FOR REGULATING DRIVING TORQUE OF VEHICLE

[75] Inventor: Kazuyuki Kogiso, Fujisawa, Japan

[73] Assignee: Nissan Motor Co., Ltd., Yokohama, Japan

[21] Appl. No.: 544,167

[22] Filed: Oct. 17, 1995

[30] Foreign Application Priority Data

Oct. 31, 1994 [JP] Japan .................. 6-267487

[51] Int. Cl.$^6$ .................................................. B60K 28/16
[52] U.S. Cl. ........................................ 180/197; 123/336
[58] Field of Search .................. 180/197; 123/336; 364/426.01, 426.03

[56] References Cited

U.S. PATENT DOCUMENTS

| | | | |
|---|---|---|---|
| 4,892,076 | 1/1990 | Toshimits et al. | 123/336 X |
| 4,971,164 | 11/1990 | Fujita et al. | 180/197 |
| 5,079,709 | 1/1992 | Hirako et al. | 180/197 X |
| 5,222,570 | 6/1993 | Kawamura et al. | 180/197 |
| 5,295,552 | 3/1994 | Kageyama et al. | 180/197 |

*Primary Examiner*—Kevin Hurley
*Attorney, Agent, or Firm*—Foley & Lardner

[57] ABSTRACT

A system for reducing a driving torque of an engine employs a diaphragm type actuator for actuating a second throttle valve disposed in an intake passage of the engine in series to an accelerator-operated ordinary throttle valve in order to provide a simplified construction. A three way solenoid valve is arranged to selectively introduce a negative pressure such as an intake manifold vacuum, or atmospheric pressure into a working chamber of the diaphragm type actuator. By being supplied with the negative pressure or the atmospheric pressure, the diaphragm type actuator puts the second throttle valve either in a fully open position or in a closed position of about ⅛ opening degree. An orifice or some other flow resisting means is provided to make an opening movement slower than a closing movement of the second throttle valve.

16 Claims, 3 Drawing Sheets

SYSTEM FOR REGULATING DRIVING TORQUE OF VEHICLE

BACKGROUND OF THE INVENTION

The present invention relates to an engine torque regulating system or a traction control system for a vehicle, and more specifically to a throttle regulating system having a second throttle valve in series to an ordinary accelerator-operated throttle valve in an intake passage of an engine, and an actuator for closing the second throttle valve in response to a request for reducing the driving torque (or driving force).

On a wet asphalt road or a snow-clad road, the drive wheels tend to slip during acceleration, and this drive wheel slippage degrades the accelerating performance of the vehicle and decreases the stability of the vehicle.

Therefore, there has been proposed a driving torque control system intended to improve the starting and accelerating ability of the vehicle and to improve the stability of the vehicle by preventing a rear end swing of the vehicle, by using a second throttle valve disposed in the intake passage of the engine, in series to an ordinary throttle valve linked with the accelerator pedal. In this conventional system, a DC motor (stepper motor) is provided to actuate the second throttle valve. When the system detects a slip by monitoring a rotational speed difference between a drive wheel speed and a non-drive wheel speed or some other vehicle operating condition, then the second throttle valve is closed to decrease the driving force (engine torque).

The DC motor can control the opening degree of the second throttle valve precisely. However, the DC motor can become a factor increasing the cost specifically when the control system is aimed to improve the starting and acceleration only in a low vehicle speed range for a FF vehicle.

Furthermore, the DC motor with a speed change mechanism is heavy in weight. In general, the DC motor is integral with a throttle chamber, so that the versatility is poor.

SUMMARY OF THE INVENTION

It is therefore an object of the present invention to provide an engine torque regulating system which can significantly reduce the cost.

According to the present invention, an engine driving torque regulating system for a vehicle, comprises: a second throttle valve disposed in series to a first throttle valve in an intake passage for an engine; and an actuating means for closing the second throttle valve to reduce a driving torque produced by the engine. The second throttle valve may be a normally open type. The actuating means comprises a negative pressure diaphragm type actuator and an operating time differentiating means. The negative pressure diaphragm type actuator comprises a diaphragm and a negative pressure working chamber for receiving a negative pressure. When the negative pressure is introduced into the negative pressure working chamber, the diaphragm moves, and the diaphragm displacement is used to move the second throttle valve between a fully open position and a predetermined closed position. The operating time differentiating means is a means for making an opening time for said second throttle valve to move from the closed position to the fully open position longer than a closing time for the second throttle valve to move from the fully open position to the closed position.

This engine torque regulating system can provide a simple on-off control system with the actuator for operating the second throttle valve between the open position and closed position like a two step system. This engine torque regulating system can quickly respond to a slip on a low mu road surface by a faster closing operation of the second throttle valve, and prevent an abrupt engine torque increase by a slower opening operation of the second throttle valve when, for example, the vehicle runs from a low mu road surface onto a high mu road surface.

The engine torque regulating system according to illustrated embodiments of the invention further comprises a pressure selecting means for selectively supplying an atmospheric pressure or the negative pressure to the negative pressure working chamber of the negative pressure diaphragm type actuator, and the pressure selecting means comprises a solenoid valve such as a three way solenoid (electromagnetic) valve. The actuator according to the illustrate embodiments is arranged to drive the second throttle valve to the closed position when the negative pressure is introduced, and to the fully open position when the atmospheric pressure is introduced. Therefore, this system allows the driver to control the vehicle with the ordinary accelerating system of the first throttle valve and the acceleration pedal in the normal manner by holding the second throttle valve in the fully open position even if the actuator becomes unable to receive the negative pressure.

The operating time differentiating means may comprise a flow resisting means, such as an orifice, for increasing a resistance that an atmospheric pressure passage offers to the fluid flow, as compared with a resistance of a negative pressure passage. The flow resisting means can define the operating times of the second throttle valve with a simple construction.

The pressure selecting means may further comprise a negative pressure supplying means for supplying the actuator with the negative pressure such as an intake manifold vacuum, and the negative pressure supplying means may comprise a negative pressure tank or reservoir connected through a check valve to a downstream portion of the intake passage downstream of the first throttle valve. The thus-arranged negative pressure supplying means can make the negative pressure supplied to the actuator stable even when the intake vacuum is varied by an engine operating condition.

The second throttle valve in the illustrated embodiments of the invention comprises a swingable throttle plate mounted on a valve shaft which is eccentrically situated with respect to the center of the intake passage, and the throttle plate comprises a first portion extending from the valve shaft to a first end in a first direction and a second portion extending from the valve shaft to a second end in a second direction. The area (or pressure receiving area) of the first portion of throttle plate is greater than that of the second portion, or the length of the first portion from the valve shaft to the first end is greater than the length of the second portion from the valve shaft to the second end. Even if the second throttle valve becomes loose and free, the thus-constructed second throttle valve is held in the open position to allow the normal operation because a pressure difference between the upstream and downstream sides of the second throttle valve applies a moment on the second throttle valves in the valve opening direction.

DETAILED DESCRIPTION OF THE INVENTION

Figure 1:
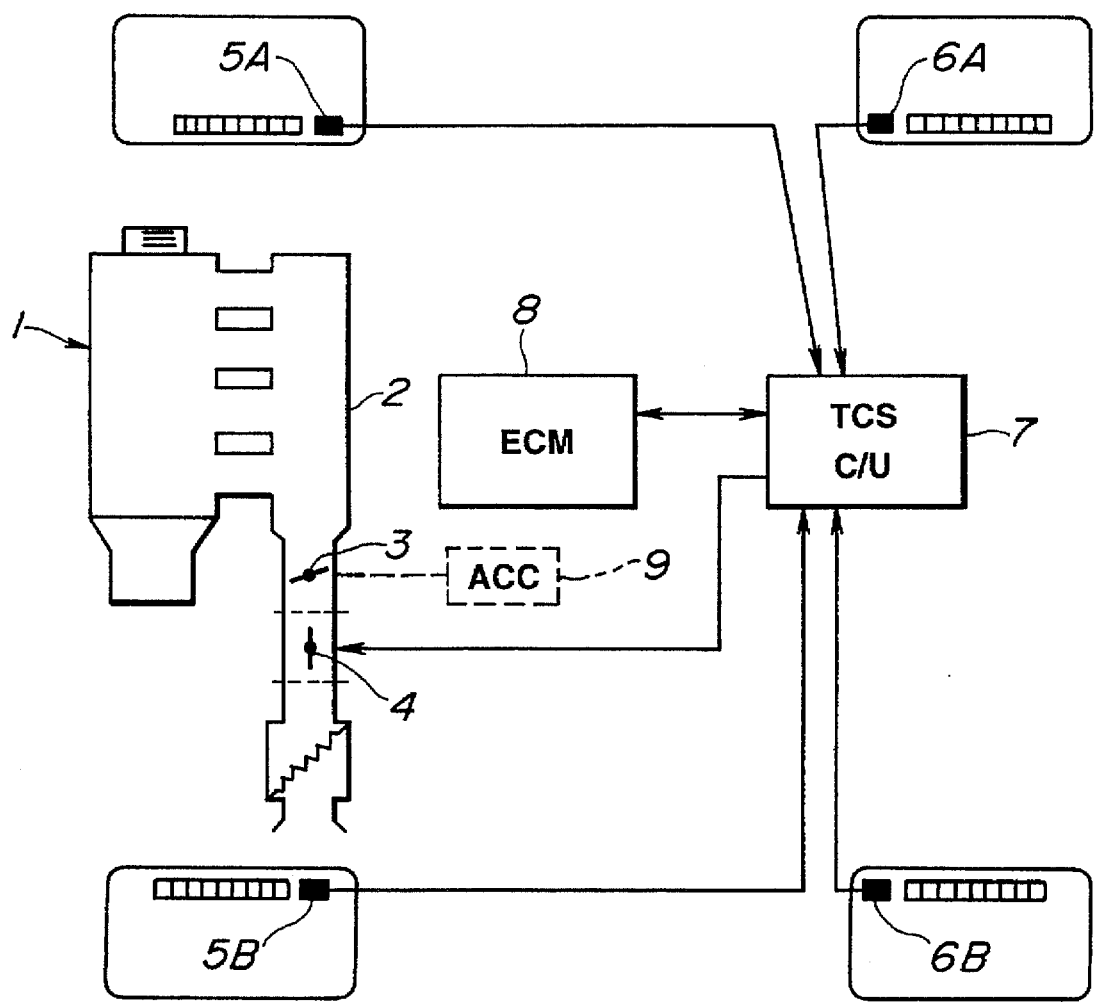
FIG. 1 is a schematic view showing a vehicle equipped with an engine torque regulating system according to a first embodiment of the present invention.
Figure 2:
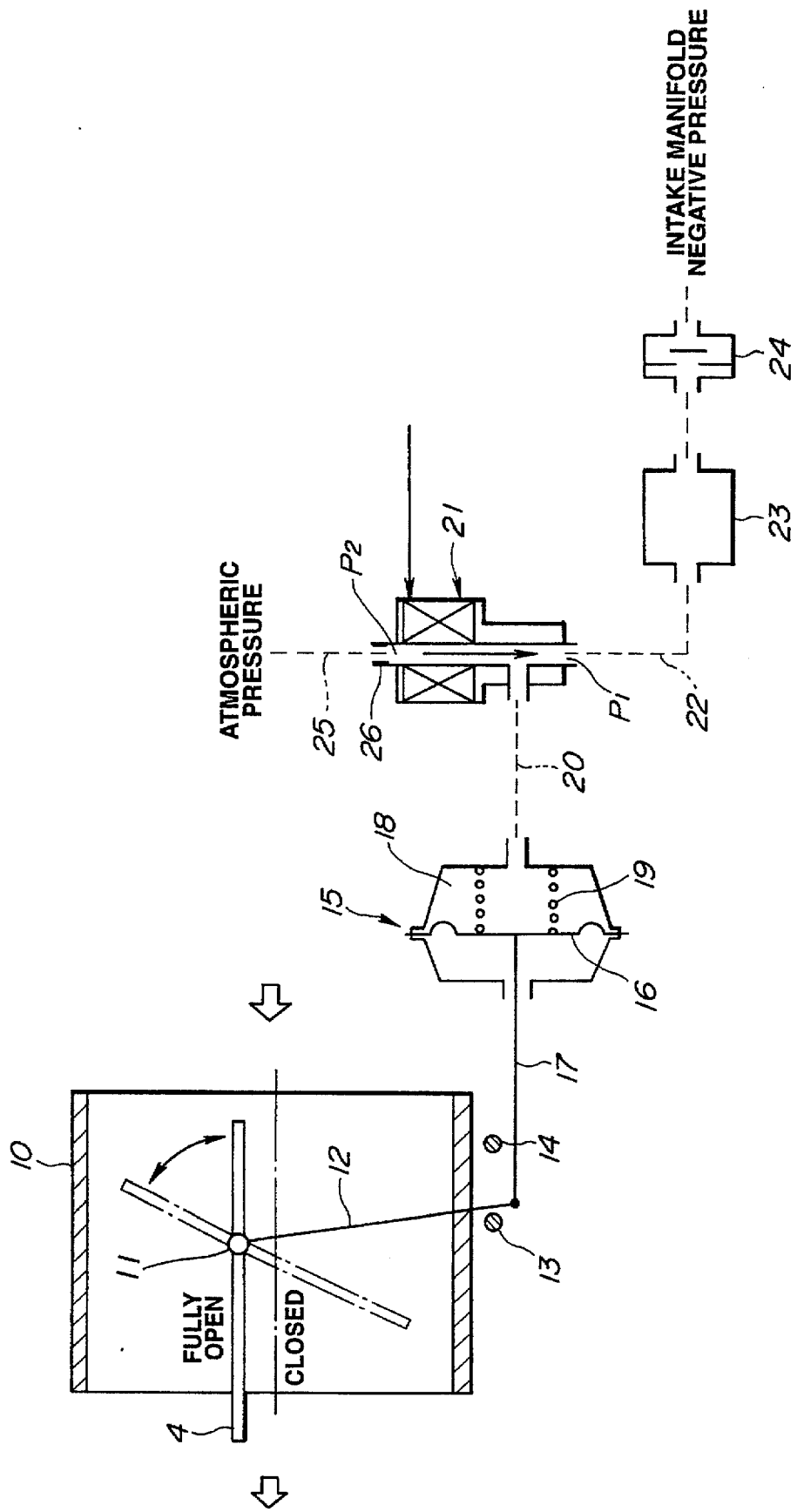
FIG. 2 is a schematic view showing an actuating system for a second throttle valve shown in FIG. 1.

FIGS. 1 and 2 shows an engine torque regulating system according to a first embodiment of the present invention.

A first throttle valve 3 is provided in an intake passage 2 of an engine 1. The engine 1 of this example is transversely mounted on an FF vehicle. The first throttle valve 3 is connected with an accelerator pedal 9 so that the opening degree of the first throttle valve 3 is determined by the depression degree of the accelerator pedal 9.

A second throttle valve 4 is further provided in the intake passage 2 of the engine 1. The second throttle valve 3 of this example is disposed on the upstream side of the first throttle valve 3. The second throttle valve 3 is a normally open valve.

Wheel speed sensors 5A and 5B are provided for right and left front wheels (drive wheels) of the vehicle. Wheel sensors 6A and 6B are for right and left rear wheels (non-drive wheels).

A traction control unit 7 receives wheel speed signals from the wheel speed sensors 5A, 5B, 6A and 6B, detects an occurrence of slip in accordance with a wheel speed difference between a drive wheel speed and a non-drive wheel speed, and produces driving force reduction request signals when the slip occurs. A first one of the driving force reduction request signals is sent to an actuating system for actuating the second throttle valve 4 (to a three way solenoid valve 21, to be exact). A second one of the driving force reduction request signals is sent to an engine control module 8, which performs a fuel cut control or the like.

The actuating system for the second throttle valve 4 according to the first embodiment of the invention is shown in FIG. 2.

A butterfly type valve is employed as the second throttle valve 4 in this example. The butterfly type second throttle valve 4 is disposed in a chamber 10 of resin forming the intake passage 2.

A valve shaft 11 of the second throttle valve 4 is eccentric, and situated to one side with respect to the center line of the chamber 10.

A lever 12 for operating the second throttle valve 4 is fixed to the valve shaft 11. The lever 12 is swingable between stoppers 13 and 14 for limiting the swing movement of the lever 12. With the aid of the stoppers 13 and 14, the second throttle valve 4 can assume a fully open position and a closed position of a predetermined small opening. In the closed position, the opening degree of the second throttle valve 4 of this example is about ⅛.

A negative pressure diaphragm type actuator 15 shown in FIG. 2 includes a diaphragm 16 which is connected with the lever 12 of the second throttle valve 4 by an output rod 17. The diaphragm type actuator 15 further includes a negative pressure working chamber 18 defined by the diaphragm 16 and a spring 19 disposed in the negative pressure chamber 18, for urging the diaphragm 16. When a negative pressure is introduced into the negative pressure chamber 18, the diaphragm 16 moves to the right as viewed in FIG. 2, and brings the second throttle valve 4 to the closed position. Introduction of the atmospheric pressure into the negative pressure chamber 18 causes a leftward displacement of the diaphragm 16, and accordingly, the second throttle valve 4 returns to the fully open position.

A three way solenoid valve 21 is connected with the negative pressure working chamber 18 of the diaphragm type actuator 17 by a communication passage 20, and arranged to selectively introduce the negative pressure or the atmospheric pressure into the negative pressure chamber 18. In an off state, the three way solenoid valve 21 closes a negative pressure inlet port P1 and opens an atmospheric pressure inlet port P2. In an on state, the atmospheric pressure inlet port P2 is closed, and the negative pressure inlet port P1 is opened.

A negative pressure tank (or reservoir) 23 and a check valve 24 are provided in a passage for introducing the negative pressure from the intake manifold to the three way solenoid valve 21. A negative pressure feed passage 22 fluidly connects the negative pressure port P1 of the three way solenoid valve 21 with the negative pressure tank 23. Through the check valve 24, the negative pressure tank 23 is further connected to the intake manifold (to the position downstream of the first throttle valve 3 in the intake passage 2).

An orifice 26 is provided in an atmospheric pressure passage 25 for introducing the atmospheric pressure to the atmospheric pressure port P2 of the three way solenoid valve 21. The orifice 26 serves as an operating time differentiating means.

The engine torque regulating system shown in FIGS. 1 and 2 is operated as follows:

In normal operations, the three way solenoid valve 21 is held in the off state. Accordingly, the negative pressure inlet port P1 is closed, and the atmospheric pressure inlet port P2 is open. In this state, the atmospheric pressure is introduced into the negative pressure chamber 18, and the spring 19 holds the second throttle valve 4 in the fully open position by pushing the diaphragm 16 leftward in FIG. 2. The fully open position corresponds to an opening degree which can ensure an amount of air required by the engine.

The traction control unit 7 of this example computes the wheel speed difference between the front wheel speed determined from the signals of the front wheel speed sensors 5A and 5B and the rear wheel speed determined from the signals of the rear wheel speed sensors 6A and 6B. When this wheel speed difference exceeds a predetermined value, the traction control unit 7 judges a slip condition present, produces an engine driving torque reduction request signal, and delivers this reduction request signal to the three way solenoid valve 21.

By this engine driving torque reduction request signal, the three way solenoid valve 21 switches from the off state to the on state, and makes the atmospheric pressure port P2 closed and the negative pressure port P1 open. Therefore, the negative pressure is introduced into the negative pressure working chamber 18 of the diaphragm unit 15, and causes the diaphragm 16 to move rightward in FIG. 2 against the resilient force of the spring 19. With this rightward displacement of the diaphragm 16, the second throttle valve 4 is brought to the closed position of an approximately ⅛ opening degree.

The opening degree of the second throttle valve 4 in the closed position is set to a predetermined small degree which is required to repress the slip, but which is not so small as to cause an engine stall. The setting to about ⅛ is adequate to repress the slip without causing an engine stall.

Figure 3:
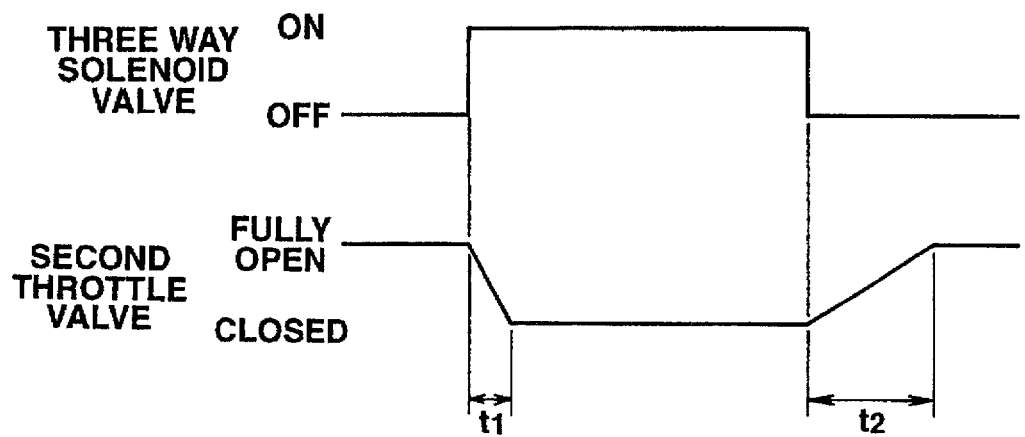
FIG. 3 is a time chart showing operating times of the second throttle valve actuating system shown in FIG. 2.

A closing time of the second throttle valve 4 is set to a very short time equal to or smaller than 0.2 sec in order to repress the slip quickly on a low μ road. The closing time (t1 in FIG. 3) is a period of time during which the second throttle valve 4 is moving from the fully open position to the closed position. The effective pressure receiving area of the diaphragm 16, the diameter of the negative pressure feed passage 22 and the like are so chosen as to decrease the closing time of the second throttle valve 4.

The closing operation of the second throttle valve 4 decreases the driving force of the engine, and lowers the degree of slip. When the degree of slip is lowered sufficiently, the traction control unit 7 cancels the driving torque reduction request signal.

The three way solenoid valve 21 is thus deprived of the reduction request signal, and returns from the on state to the off state. Therefore, the negative pressure inlet port P1 closes and the atmospheric pressure inlet port P2 opens and introduces the atmospheric pressure into the negative pressure working chamber 18 of the diaphragm unit 15. The diaphragm 16 moves leftward in FIG. 2 by the force of the spring 19 and returns the second throttle valve 4 to the fully open position.

An opening time required for the second throttle valve 4 to move from the closed position to the fully open position (12 shown in FIG. 3) is set equal to more than ten times as much as the closing time (t1) from the fully open position to the closed position in order to prevent an undesired feeling of dashing when the road changes from a low μ condition to a high μ condition. In this example, the closing time (t2) is set to 2~7 sec by making a flow passage resistance of the atmospheric pressure passage 25 with the orifice 26 than that of the negative pressure feed passage 22.

The diaphragm actuator 15 is designed to hold the second throttle valve 4 in the fully open position even if the negative pressure disappears for one reason or another. In this case, the pressure in the negative pressure chamber 18 becomes equal to the atmospheric pressure, and the second throttle valve 4 is put in the fully open position. Therefore, this control system allows the vehicle to be operated even in such a case.

With the eccentric or asymmetric arrangement, the second throttle valve 4 remains open even if the second throttle valve 4 becomes loose, freely rotatable or disconnected from the output rod 17, for example. The valve shaft 11 is deviated from the center of the intake passage 2, and the pressure receiving area of the valve element on one side of the valve shaft 11 is greater than that on the other side of the valve shaft 11. Therefore, the pressure difference between the upstream side of the second throttle valve and the downstream side (receiving a negative pressure) produces a moment in the direction to open the second throttle valve 4. This control system allows the vehicle to be operated even in this case.

Figure 4:
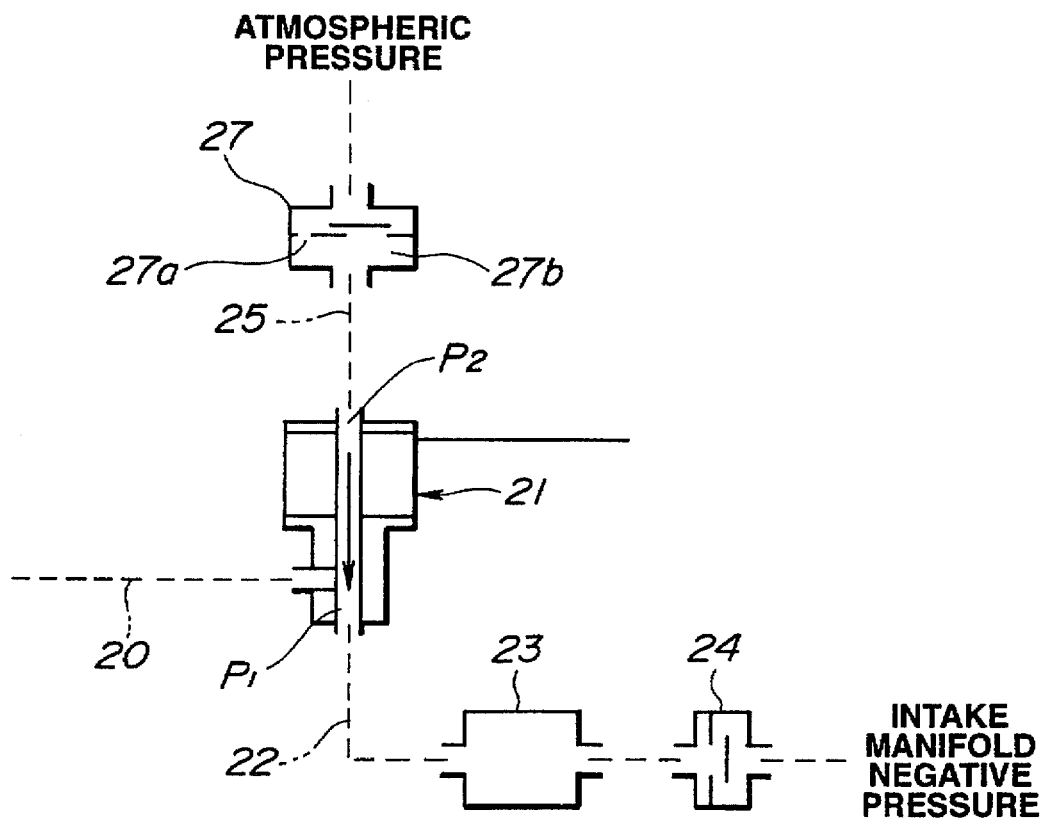
FIG. 4 is a schematic view showing a second throttle valve actuating system according to a second embodiment of the present invention.

FIG. 4 shows an actuating system of an engine torque regulating system according to a second embodiment of the present invention.

A one way delay valve 27 is substituted, as shown in FIG. 4, for the orifice 26. The one way delay valve 27 is disposed in the atmospheric pressure feed passage 25 leading to the atmospheric pressure inlet port P2 of the three way solenoid valve 21.

The one way delay valve 27 of this example has an orifice hole 27a of a small diameter and a check valve 27b which are arranged in parallel to each other. When the atmospheric pressure is to be introduced, the check valve 27b is closed and the orifice hole 27a alone permits the atmospheric pressure to flow into the atmospheric pressure inlet port P2 of the three way solenoid valve 21.

The orifice hole 27a of the one way delay valve 27 makes the operating time (opening time) for the second throttle valve 4 to return from the closed position to the fully open position longer than the operating time (closing time) to close the second throttle valve 4.

It is optional to dispose a one way delay valve of this type in the communication passage 20 between the negative pressure chamber 18 of the diaphragm unit 15 and the three way solenoid valve 21. In this case, the one way delay valve can quickly introduce the negative pressure to the negative pressure chamber 18 of the diaphragm unit 15 without delay, and gradually introduce the atmospheric pressure with delay.

What is claimed is:

1. An engine torque regulating system for a vehicle, comprising:
   (a) a second throttle valve disposed in series to a first throttle valve in an intake passage for an engine; and
   (b) an actuating means for closing said second throttle valve to reduce a driving torque produced by the engine, said actuating means comprising;
      (i) an actuator comprising a negative pressure working chamber for receiving a negative pressure, and a diaphragm for moving said second throttle valve between a fully open position and a predetermined closed position in accordance with a pressure in said negative pressure working chamber; and
      (ii) an operating time differentiating means for making longer an opening time required for said second throttle valve to move from said predetermined closed position to said fully open position than a closing time required for said second throttle valve to move from said fully open position to said predetermined closed position.

2. A regulating system as claimed in claim 1 wherein said actuating means further comprises a three way solenoid valve, connected by a communication passage with said negative pressure working chamber of said actuator, for selectively introducing one of the negative pressure and an atmospheric pressure into said negative pressure working chamber, and said actuator comprises a biasing means for holding said diaphragm in an opening position to hold said second throttle valve in said fully open position when the atmospheric pressure is introduced in said negative pressure working chamber, and for allowing said diaphragm to move to a closing position to hold said second throttle valve in said predetermined closed position when the negative pressure is introduced in said negative pressure working chamber.

3. A control system as claimed in claim 2 wherein said actuating means further comprises a negative pressure supply passage for supplying the negative pressure to said three way solenoid valve, and an atmospheric pressure supply passage for supplying the atmospheric pressure to said negative pressure working chamber of said actuator, and said operating time differentiating means comprises a flow resisting means for making a flow resistance of said atmospheric pressure supply passage greater than a flow resistance of said negative pressure supply passage.

4. A regulating system as claimed in claim 1 wherein said actuating means further comprises a negative pressure source comprising a check valve, and a negative pressure tank which is connected through said check valve to a downstream section of said intake passage downstream of said first throttle valve.

5. A regulating system as claimed in claim 1 wherein said second valve is a butterfly valve comprising a throttle plate swingable on a pivot axis which is situated away from a center of the intake passage.

6. A regulating system as claimed in claim 1:

wherein said actuating means further comprises a pressure selecting means for selectively supplying one of the negative pressure and an atmospheric pressure to said negative pressure working chamber of said actuator;

wherein said actuator comprise a spring for holding said diaphragm in an opening position to put said second throttle valve in said fully open when the atmospheric pressure is introduced to said negative pressure working chamber of said actuator, and for allowing said diaphragm to move to a closing position to put said second throttle valve in said predetermined closed position when the negative pressure is introduced into said negative pressure working chamber of said actuator; and wherein said actuating means further comprises a first pressure passage for supplying the negative pressure to said negative pressure chamber of said actuator and a second passage for supplying the atmospheric pressure to said negative pressure chamber of said actuator, and said operating time differentiating means comprises a flow resisting means for making a flow resistance of said second passage for the atmospheric pressure greater than a flow resistance of said first pressure passage for the negative pressure.

7. A regulating system as claimed in claim 6:

wherein said pressure selecting means comprises a negative pressure supplying means for supplying an intake manifold vacuum to said negative pressure working chamber of said actuator;

wherein said regulating system further comprises a sensing means for sensing a vehicle operating condition of the vehicle, and a controlling means for producing a torque reduction request signal to reduce the driving torque of the engine in accordance with the vehicle operating condition sensed by said sensing means; and wherein said pressure selecting means includes a means for normally supplying the atmospheric pressure to said negative pressure working chamber of said actuator and supplying the negative pressure in response to said torque reduction request signal.

8. A regulating system as claimed in claim 7:

wherein said pressure selecting means comprises a solenoid valve comprises a first inlet port for receiving the negative pressure, a second inlet port for receiving the atmospheric pressure, an outlet port connected to said negative pressure working chamber of said actuator, and a solenoid for closing said first inlet port and open said second inlet port when said solenoid is deenergized, and for opening said first inlet port and closing said second inlet port when said solenoid is energized; and wherein said flow resisting means of said operating time differentiating means comprises an orifice disposed in said second pressure passage.

9. A regulating system as claimed in claim 8:

wherein said second throttle valve is disposed on an upstream side of said first throttle valve in the intake passage; and wherein said negative pressure supplying means comprises a negative pressure supply passage connecting the first inlet port of said solenoid valve with a downstream section of the intake passage downstream of said first throttle valve.

10. A regulating system as claimed in claim 9:

wherein said second throttle valve comprises a swingable throttle plate mounted on a valve shaft, said throttle plate of said second throttle valve comprises a first plate portion extending from said valve shaft to a first plate end in a first direction and a second plate portion extending from said valve shaft to a second plate end in a second direction, and an area of said first plate portion is greater than an area of said second plate portion; and wherein said actuating means further comprises a limiting means for defining said predetermined closed position of said second throttle valve by limiting a swing movement of said throttle plate of said second throttle valve in a closing direction to said predetermined closed position, and an opening degree of the intake passage determined by said second throttle valve in said predetermined closed position is smaller than that of said second throttle valve in said fully open position but greater than a predetermined positive value to admit a limited amount of intake air.

11. A regulating system as claimed in claim 10:

wherein said negative pressure supplying means comprises a vacuum tank connected with said first inlet port of said solenoid valve and a check valve through which said vacuum tank is connected with the intake passage on a downstream side of said first throttle valve;

wherein said first throttle valve is a throttle valve connected with an accelerator pedal of the vehicle; and wherein said limiting means of said actuating means includes a means for limiting movement of said second throttle valve between said fully open position and said predetermined closed position.

12. A regulating system as claimed in claim 11:

wherein said second throttle valve comprises a pivot shaft on which said throttle plate of said second throttle valve is mounted, and a lever for rotating said pivot shaft;

wherein said limiting means comprises a first stopper for limiting a swing movement of said lever of said second throttle valve in one direction and a second stopper for limiting a swing movement of said lever in an opposite direction;

wherein said lever is linked by a connecting rod with said diaphragm;

wherein said spring of said actuator is disposed in said negative pressure working chamber; and wherein said sensing means comprises a drive wheel slip sensing means for sensing a drive wheel slipping condition of the vehicle, and said controlling means comprises a traction control unit for producing said torque reduction request signal in accordance with said drive wheel slipping condition.

13. A regulating system as claimed in claim 12:

wherein said drive wheel slip sensing means comprises wheel speed sensors for sensing a drive wheel speed and a non-drive wheel speed of the vehicle, and said traction control unit produces said driving torque reduction request signal in accordance with a wheel speed difference between said drive wheel speed and said non-drive wheel speed;

wherein an opening degree of the intake passage determined by said second throttle valve in the predetermined closed position is equal to or greater than a predetermined opening degree required to prevent an engine stall; and wherein said opening time of said second throttle valve is equal to or greater than said closing time multiplied by ten.

14. A regulating system as claimed in claim 8 wherein said orifice is disposed in said second inlet port of said solenoid valve.

15. A regulating system as claimed in claim 8 wherein said operating time differentiating means further comprises a parallel check valve disposed in parallel to said orifice.

16. A regulating system as claimed in claim 15 wherein said orifice is disposed in said second pressure passage leading to said second inlet port of said solenoid valve.

* * * * *